F. H. KINDL, DEC'D.
F. H. KINDL, Jr., ADMINISTRATOR.
APPARATUS FOR HANDLING MATERIALS.
APPLICATION FILED JUNE 21, 1913.
1,142,968.
Patented June 15, 1915.
5 SHEETS—SHEET 4.
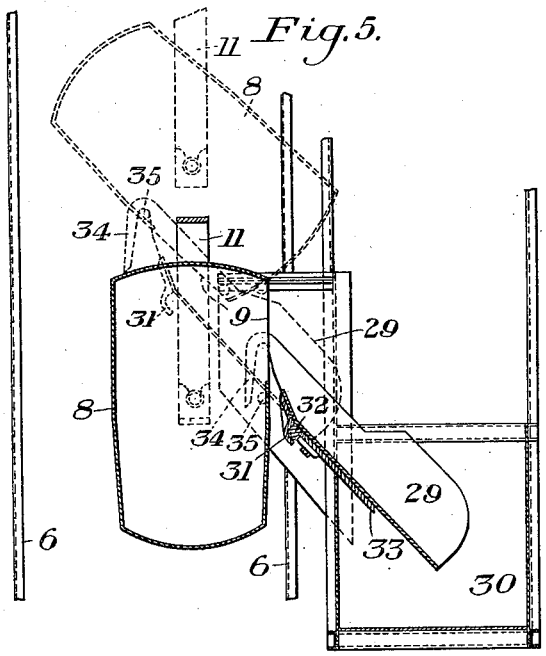
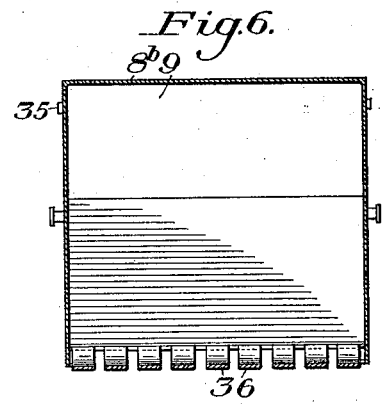
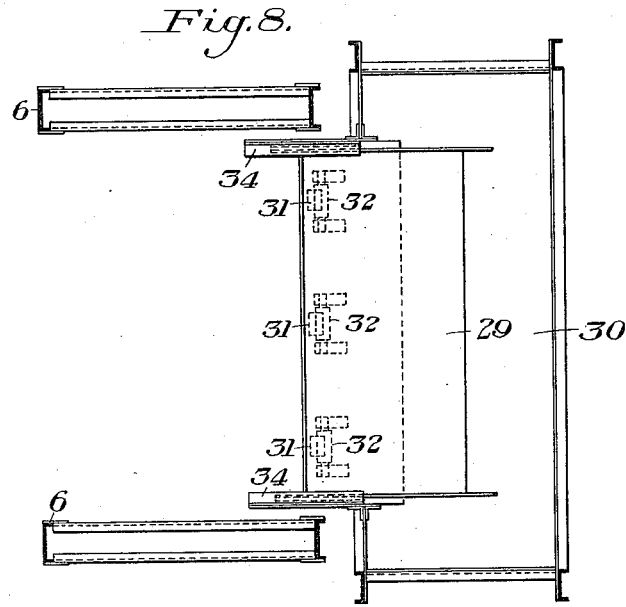
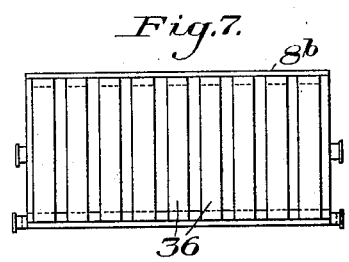
WITNESSES
INVENTOR F. H. KINDL, DEC'D.
F. H. KINDL, Jr., ADMINISTRATOR.
APPARATUS FOR HANDLING MATERIALS.
APPLICATION FILED JUNE 21, 1913.
1,142,968.
Patented June 15, 1915.
5 SHEETS—SHEET 5.
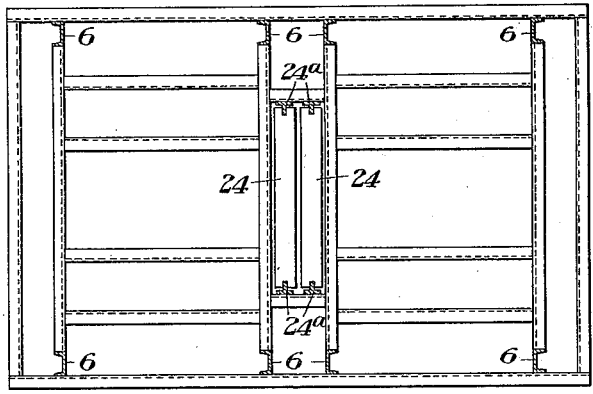
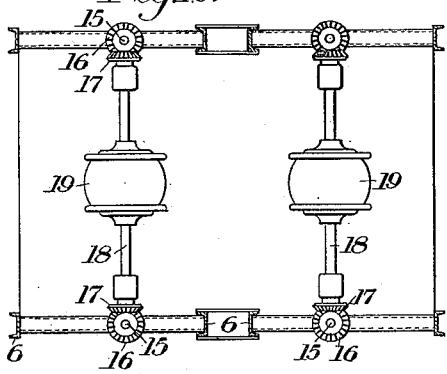
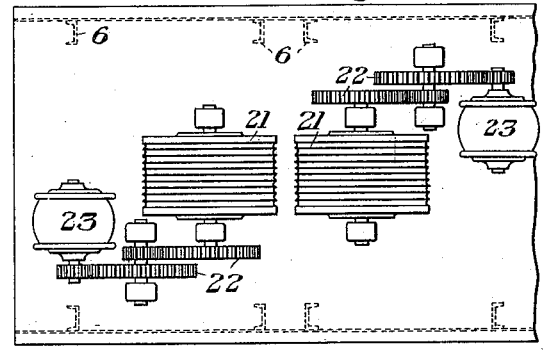
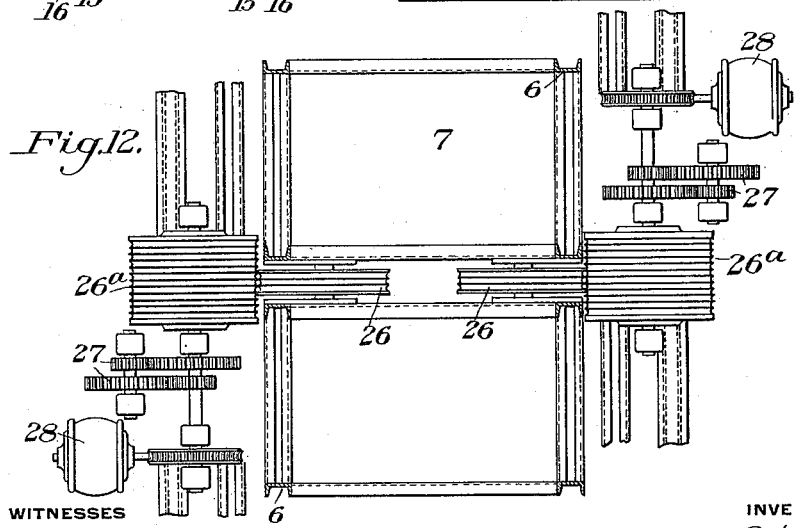

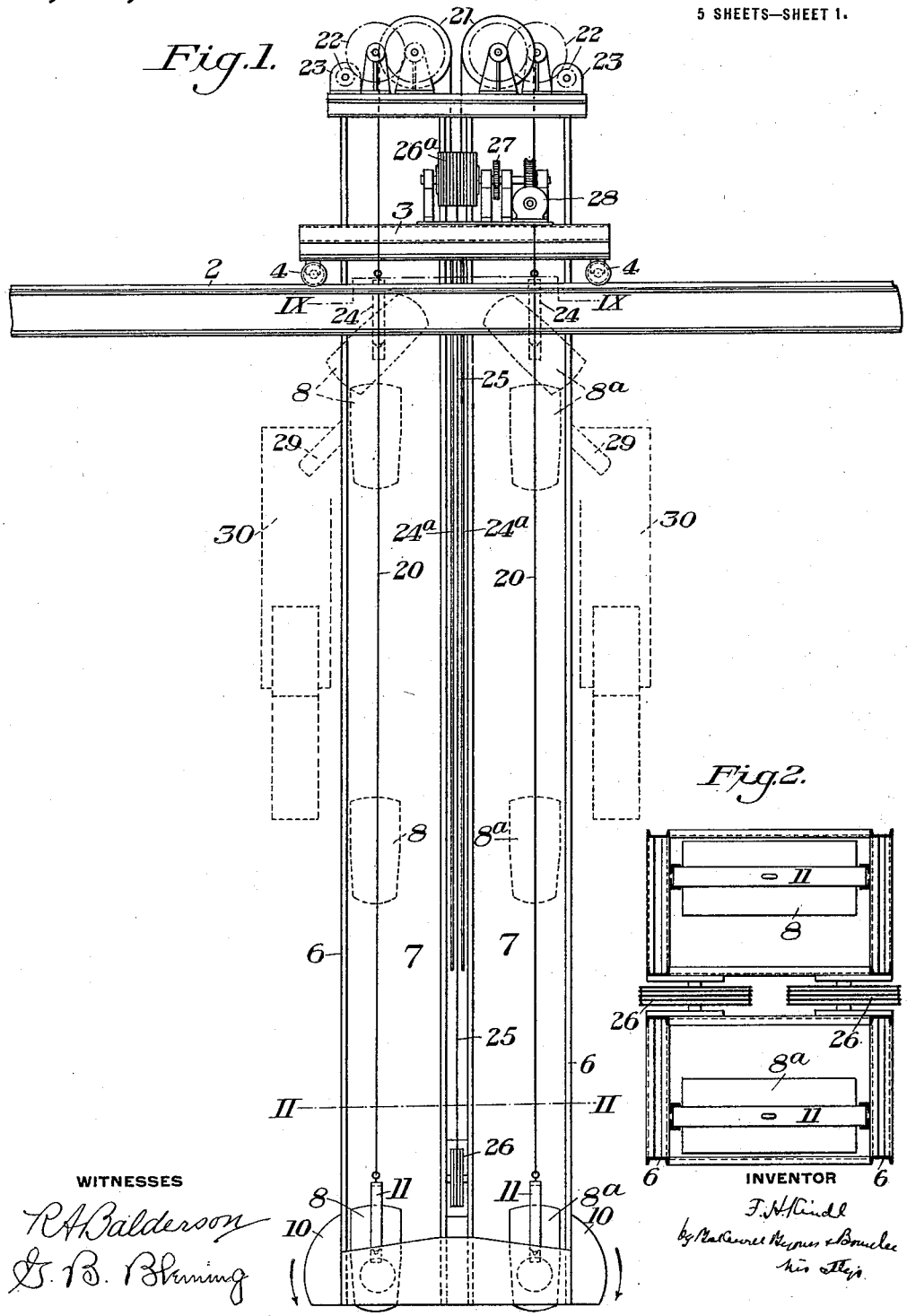

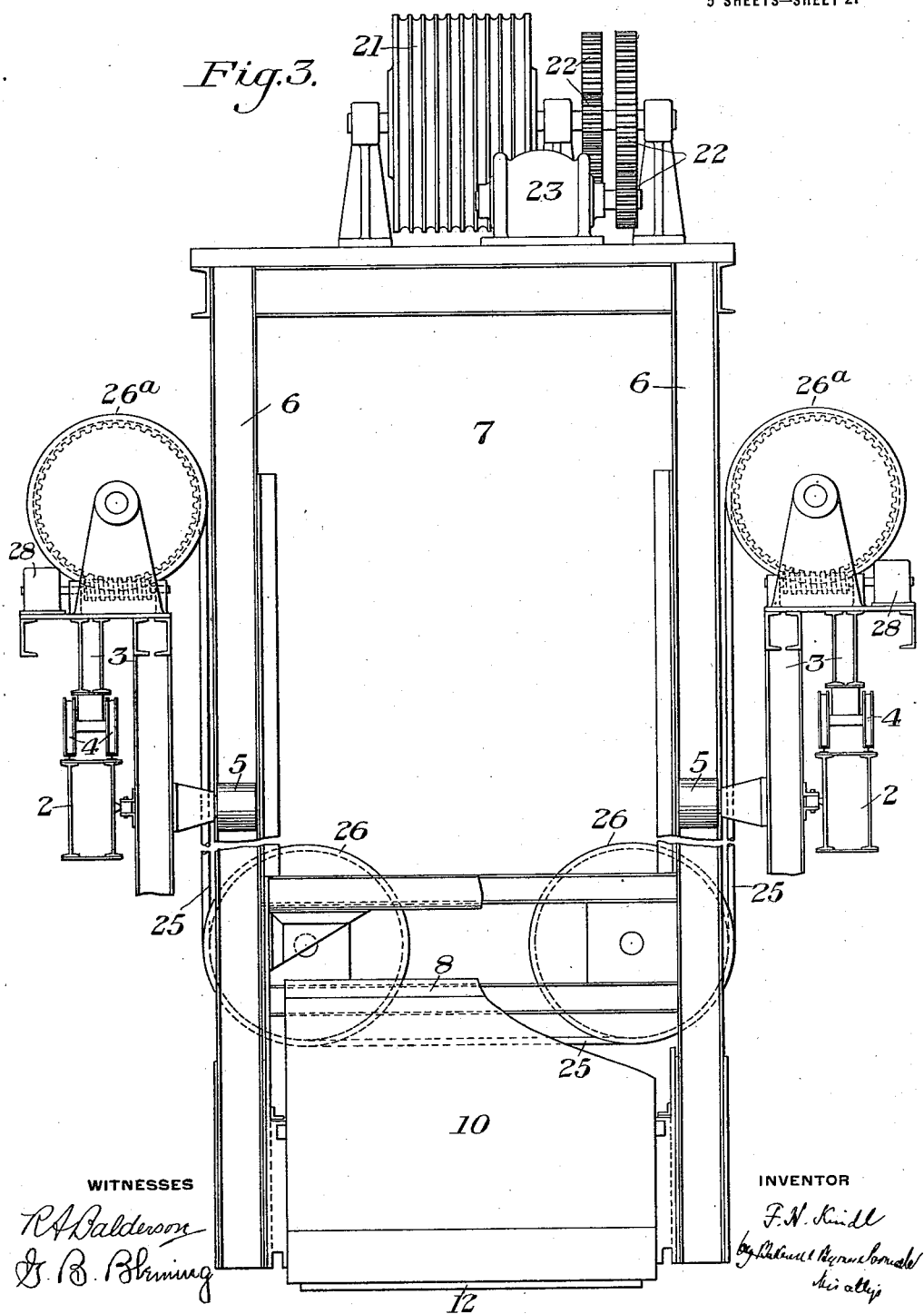

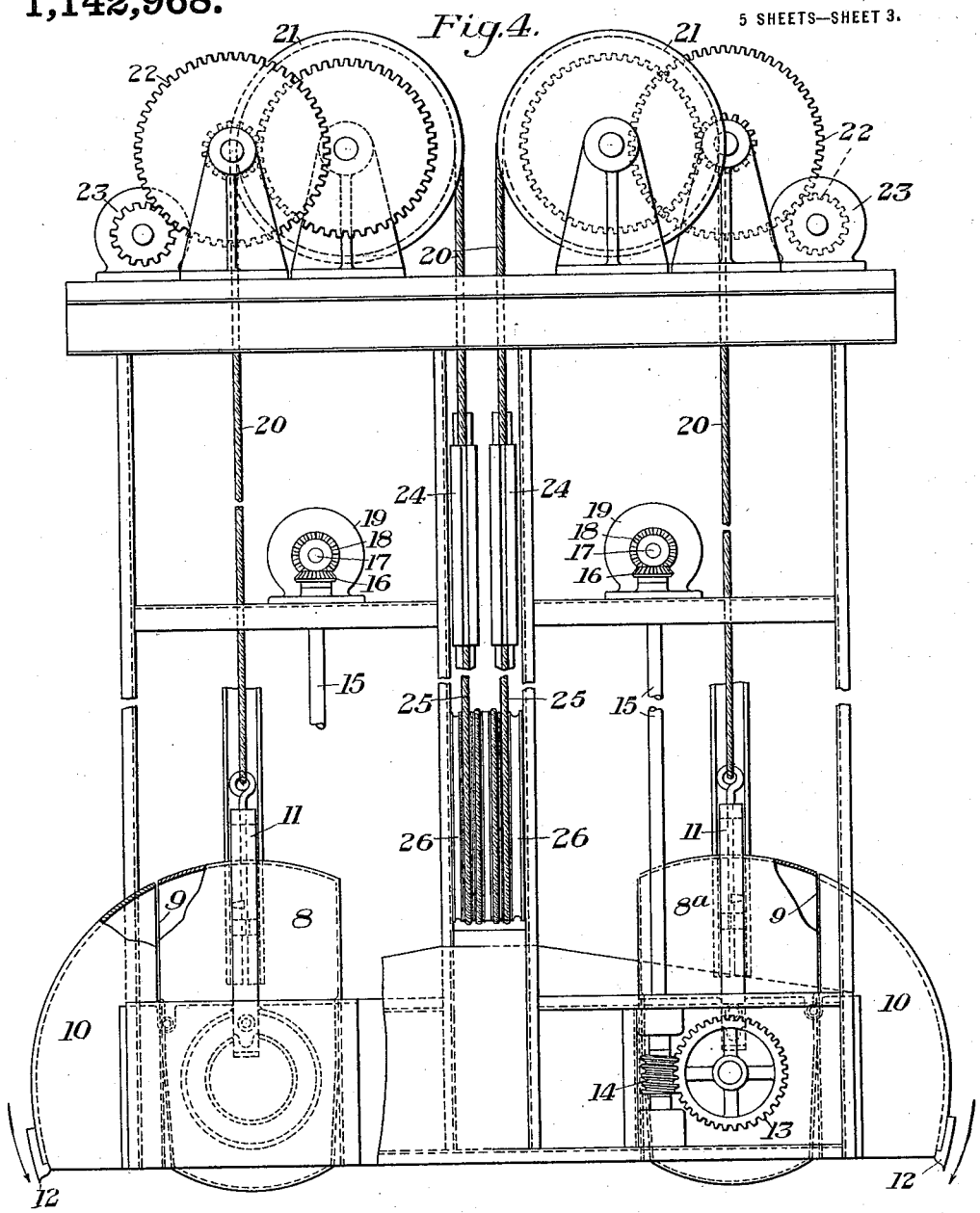

UNITED STATES PATENT OFFICE.

FREDERICK H. KINDL, OF PITTSBURGH, PENNSYLVANIA; F. H. KINDL, JR., ADMINISTRATOR OF SAID FREDERICK H. KINDL, DECEASED.

APPARATUS FOR HANDLING MATERIALS.

1,142,968.  Specification of Letters Patent. Patented June 15, 1915.

Application filed June 21, 1913. Serial No. 774,998.

*To all whom it may concern:*

Be it known that I, FREDERICK H. KINDL, a citizen of the United States, residing at Pittsburgh, in the county of Allegheny and State of Pennsylvania, have invented a new and useful Improvement in Apparatus for Handling Materials, of which the following is a full, clear, and exact description, reference being had to the accompanying drawings, forming part of this specification, in which—

Figure 1 is a side elevation partially broken away of apparatus embodying my invention; Fig. 2 is a section on the line II—II of Fig. 1; Fig. 3 is an end elevation on a larger scale and partly broken away of a portion of the leg; Fig. 4 is a front elevation partly broken away of a portion of the leg; Fig. 5 is a sectional elevation of a portion of the leg and showing the bucket dumping mechanism; Fig. 6 is a vertical section of a modified form of bucket; Fig. 7 is a plan view of the bucket shown in Fig. 6; Fig. 8 is a sectional view showing the bucket dumping mechanism; Fig. 9 is a section on the line IX—IX of Fig. 1; Fig. 10 is a sectional plan view showing the arrangement of the motors and gearing for rotating the bucket holders; Fig. 11 is a plan view showing the arrangement of the motors and gearing for raising and lowering the buckets; and Fig. 12 is a plan view showing the arrangement of the motors and gearing for raising and lowering the leg.

My invention has relation to apparatus for handling materials such as coal, ores, dirt, gravel, grains, etc., and is designed to provide apparatus of this character by means of which material of this character can be rapidly loaded or unloaded, as for instance, in unloading vessels, loading cars from stock piles, etc.

The nature of my invention will be best understood by reference to the accompanying drawings, in which I have shown the preferred embodiment thereof, and which will now be described, it being premised, however, that various changes can be made in the details of construction and arrangement of the parts without departing from the spirit and scope of my invention as defined in the appended claims.

In these drawings, the numeral 2 designates a portion of a traveling framework, which may be a crane structure of any suitable character, such for instance, as that shown in my Patent No. 711,772 of October 21st, 1902; or said frame may be a fixed overhead supporting structure. Mounted to travel on the longitudinal girders of this framework is a carriage 3 having the wheels 4 which travel on the girders. This carriage has the inwardly projecting guides 5, which engage the flanged vertical beams or columns 6 of a vertically movable leg 7. This leg is formed of a plurality of these vertical channels or columns suitably braced and connected, and forming two vertical runways for the hoisting buckets 8 and 8$^a$. Each of these buckets is in general similar to the bucket of my said patent, and is operated in substantially the same manner; that is to say, each bucket has a filling opening 9 at one side, and is lowered into a rotary bucket holder 10. The buckets are then disengaged from their hoisting bails 11, and are rotated in the holders through the mass of material. During this rotary movement they are filled and brought back to position to be again engaged by the bails and hoisted to the upper end portion of the leg, where they are dumped. The present invention, however, comprises a double leg with two bucket holders and buckets, the two holders being so arranged as to act against each other in filling and thus equalize the strains. Thus, referring to Figs. 1 and 4, the two bucket holders 10 are arranged to be rotated downwardly and inwardly in the opposite directions indicated by the arrows, in filling the buckets 8 and 8$^a$. The bucket holders are provided with the cutting edges 12, in order to more readily force their way through the material, which is forced through the holders 10 and into the filling openings 9 of the buckets. The buckets are in general seated and revolved in the holders in the manner described in my said patent, to which reference may be had for a more complete description. In the present case, however, I prefer to rotate the bucket holders as follows:—On each trunnion of each bucket I mount a worm wheel 13, which is engaged by worm 14 on a vertical shaft 15. Each of these shafts 15 carries a bevel gear 16 at its upper end, which is engaged by a similar wheel 17 on the armature shaft 18 of an electric motor 19. The general arrangement of the motors and gearing is clearly shown in Fig. 10.

The two buckets are raised and lowered by means of the hoisting ropes and cables 20, each of which at its upper end passes over a winding drum 21. Each of these drums is driven through a suitable gearing 22 by an electric motor 23 mounted on the top of the leg (see Figs. 4 and 12). After passing around the drums 21, the free end portions of the ropes or cables 20 pass down through a space provided therefor at the central portion of the leg, and are connected to counterweights 24. These counterweights are mounted to travel on suitable guides 24ª. (See Fig. 9.) The entire leg is arranged to be raised and lowered by means of suitable motors and gearing mounted on the carriage 3.

In the drawings I have shown a rope or cable 25 as having its central portion passing underneath two sheaves 26 journaled on the leg, and its respective end portions extending over and around the winding drums 26ª. One of these drums is journaled at each side of the leg on the carriage 3, and is driven through suitable train of gearing 27 from an electric motor 28. By the simultaneous actuation of these two motors, the entire leg may be raised as may be desired. After the buckets have been filled in the manner above described, the motors 23 are actuated to hoist the buckets on the leg to their dumping positions.

A further object of my invention is to provide bucket dumping means of improved character whereby it is not necessary to give the bucket a bodily lateral movement with respect to its vertical line of travel in order to cause it to dump outside of the leg. The two buckets are arranged to dump at opposite sides of the leg, as shown in Fig. 1; and in accordance with my invention, I provide the troughs 29 to receive the discharge from the buckets and deliver the material into the vertical chutes 30. Each trough is normally supported in the inclined and lowered position shown in Fig. 5 by means of hooks 31 thereon which engage the pins 32 on the leg, and the trough normally resting on the inclined support 33 on which it is also arranged to slide. Each trough is provided with the hooked extensions 34, which project into the leg and into the path of travel of the bucket so as to be engaged by the studs or projections 35 on the bucket. As the bucket is raised to the full line position shown in Fig. 5, the studs or projections 35 enter the hooks 34. The continued upward movement of the bucket not only causes the bucket to turn on its trunnion bearings in the lifting bail, but also draws the trough 29 upwardly and inwardly, until the bucket and trough assume the position shown in dotted lines in Fig. 5. The filling and discharge opening 9 of the bucket is then directly over the upper portion of the trough and the bucket discharges its contents into the trough and thence into the chute 30. In this manner it is unnecessary to move the bucket bodily to one side to cause it to discharge outside of the leg.

In Figs. 6 and 7 I have shown a modified form of bucket such as it may be desired to use where the material to be handled is covered with water. This modified form of bucket 8ᵇ is similar to that shown in the other figures except that it has a slatted or perforated bottom 36.

My invention provides apparatus of the character described by means of which materials can be very rapidly loaded or unloaded, since two buckets can be simultaneously operated. If desired, however, it will be obvious that either bucket can be operated alone. A further advantage of my invention results from the manner in which the dumping of the buckets is effected without bodily lateral movement thereof; and still other advantages result from the general construction and arrangement of the parts and from the ease with which they may be operated and controlled.

What I claim is:—

1. In apparatus of the character described, a vertically movable leg having two vertical bucket runways, a bucket holder rotatably mounted at the lower portion of each runway, a bucket mounted in each runway and movable into and out of its holder, means for simultaneously rotating the bucket holders in opposite directions, and hoisting means for said buckets; substantially as described.

2. Apparatus of the character described, comprising a vertical leg mounted for vertical and also for horizontal movement and having two vertical bucket runways, a bucket holder rotatably mounted at the lower portion of each runway, means for rotating the bucket holders in opposite directions mounted on the leg, a bucket movable in its runway into and out of each bucket holder, and hoisting means for each bucket; substantially as described.

3. In apparatus of the character described, a vertically movable bucket having two parallel vertical bucket runways, a rotary bucket holder rotatably mounted at the lower portion of each runway, a separate motor and gearing for rotating each bucket holder, the motors and gearings being arranged to turn the holders in opposite directions, a bucket mounted to travel in each runway into and out of engagement with its bucket holder, and separate motors and actuating connections for raising and lowering the buckets, together with motive means for effecting a bodily raising and lowering movement of the leg; substantially as described.

4. In apparatus of the character described, a leg having a vertical bucket runway, a bucket mounted for travel in said runway, hoisting means for the bucket, and a discharge trough slidably mounted on the leg, said bucket and trough having coöperating means for sliding the trough and tipping the bucket; substantially as described.

5. In apparatus of the character described, a vertical leg having a vertical bucket runway therein, a bucket mounted to travel up and down said runway, hoisting means attached to the bucket, an inclined trough slidably supported on the leg and having projections extending into the runway, and means on the bucket for engaging said projections to thereby pull the trough upwardly and inwardly into the runway and simultaneously therewith tip the bucket into dumping position with relation to the trough; substantially as described.

In testimony whereof, I have hereunto set my hand.

FREDERICK H. KINDL.

Witnesses:
G. M. VIERS,
H. M. CORWIN.

Copies of this patent may be obtained for five cents each, by addressing the "Commissioner of Patents, Washington, D. C."